T

United States Patent
Ueno et al.

(10) Patent No.: US 7,463,655 B2
(45) Date of Patent: Dec. 9, 2008

(54) METHOD OF TRANSMITTING DATA WITH REDUNDANT STRUCTURE, AND DEVICE FOR TRANSMITTING DATA BY SAID METHOD

(75) Inventors: Kyoko Ueno, Kawasaki (JP); Sumio Koseki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 892 days.

(21) Appl. No.: 10/125,825

(22) Filed: Apr. 19, 2002

(65) Prior Publication Data

US 2003/0117952 A1 Jun. 26, 2003

(30) Foreign Application Priority Data

Dec. 26, 2001 (JP) .............................. 2001-394728

(51) Int. Cl.
*H04J 3/02* (2006.01)
(52) U.S. Cl. .................... 370/539; 370/228; 370/218
(58) Field of Classification Search ......... 370/216–228, 370/242–252, 400–410
See application file for complete search history.

(56) References Cited

U.S. PATENT DOCUMENTS

| | | | |
|---|---|---|---|
| 6,201,788 B1* | 3/2001 | Ishiwatari | 370/228 |
| 6,504,963 B1* | 1/2003 | Fang et al. | 385/16 |
| 6,587,235 B1* | 7/2003 | Chaudhuri et al. | 370/216 |
| 6,643,464 B1* | 11/2003 | Roorda et al. | 398/59 |
| 6,690,644 B1* | 2/2004 | Gorshe | 370/219 |
| 6,795,394 B1* | 9/2004 | Swinkels et al. | 370/222 |
| 7,031,252 B1* | 4/2006 | Hosler et al. | 370/217 |
| 2003/0076857 A1* | 4/2003 | Morita et al. | 370/466 |

* cited by examiner

*Primary Examiner*—Chi H. Pham
*Assistant Examiner*—Thai D. Hoang
(74) *Attorney, Agent, or Firm*—Katten Muchin Rosenman LLP

(57) ABSTRACT

The present invention provides a data transmission method in which a SONET is applied to Ethernet LANs. This method realizes a redundant structure of the Ethernet while utilizing the bandwidth of the SONET. On a server side, a working path and a back-up path of the Ethernet are multiplexed onto the same path of the SONET, and data transmission is conducted through the multiplexed path. On a client side, a data packet transmitted through the multiplexed path is divided by a filtering operation through detection of a port ID added on the transmitting side.

15 Claims, 11 Drawing Sheets

METHOD OF TRANSMITTING DATA WITH REDUNDANT STRUCTURE, AND DEVICE FOR TRANSMITTING DATA BY SAID METHOD

BACKGROUND OF THE INVENTION

The present invention generally relates to data transmission methods and data transmission devices, and, more particularly, a SDH (Synchronous Digital Hierarchy)/SONET (Synchronous Optical Network) transmission system that complies with the Ethernet (a registered trade name) protection system, and increases a transmission efficiency by applying the Ethernet protection system to the SDH/SONET transmission system.

In recent years, as Ethernet LANs have been widely used, there is an increasing demand for suitable protection provided to prevent packet transmission data from being damaged even when a fault occurs in a transmission path. In response to such a demand, there is a method called "dual-homing" method.

FIGS. 1A and 1B illustrate a protection system in accordance with a dual-homing method. As shown in FIG. 1A, this system includes a master LAN switch LS-M and a slave LAN switch LS-S, and a server 10 is connected to clients 21 and 22 via working paths P-W1 and P-W2 and back-up paths P-P1 and P-P2. In this system, actual data packets are normally transmitted through the working paths P-W1 and P-W2, while control packets are transmitted through the back-up paths P-P1 and P-P2.

It is assumed here that a fault has occurred in the master LAN switch LS-M, to which the working paths P-W1 and P-W2 are connected, and, as a result, it has become impossible to transmit actual data packets through the working paths P-W1 and P-W2 in the above structure. In such a case, the fault is detected by the provided protection system, and switching control is then performed on the master LAN switch LS-M and the slave LAN switch LS-S, so that the actual data packets can be transmitted through the back-up paths P-P1 and P-P2, through which the control packets have been transmitted until then, instead of the working paths P-W1 and PW2. The switching control is performed at a high speed so as to switch the paths without causing a time lag. By doing so, an accident such as inadvertent discard of data packets can be prevented.

In the above dual-homing system, the backup paths P-P1 and P-P2 need to take all data traffic, instead of the working paths P-W1 and P-W2, but, in a normal operation, the back-up paths P-P1 and P-P2 transmit only the control packets. This implies that only a half of the capacity of the four paths P-W1, P-W2, P-P1, and P-P2, is utilized, which presents a problem of poorer path usability.

To use the LANs of the above Ethernet type over a long distance, a communication system using a multiplexing communication network SONET has been developed.

FIGS. 2A and 2B illustrate a structure in which LANs of the Ethernet type are applied to (or mapped onto) a SONET so as to realize LANs over a long distance.

In this case, the above four paths P-W1, P-W2, P-P1, and P-P2 need to be realized in the SONET, and, to do so, the corresponding transmission bandwidth needs to be ensured on the optical cable transmission paths that constitute the SONET. Furthermore, it is a known fact that a SONET has its own protection system (or redundant structure), and only a half of the transmission bandwidth of the SONET is utilized accordingly. When LANs of the dual-homing Ethernet type provided with the above protection are applied to a SONET, the resultant usability of the transmission bandwidth will be only a fourth of the usability of a structure that is not provided with a protection (or a redundant structure).

SUMMARY OF THE INVENTION

A general object of the present invention is to provide data transmission methods and data transmission devices in which the above disadvantages are eliminated.

A more specific object of the present invention is to provide a data transmission method in which LANs of the Ethernet type provided with a protection are applied to a SONET (or mapped onto the SONET) so as to realize a long-distance LAN and increase the usage efficiency of the transmission bandwidth of a SONET.

The above objects are achieved by a structure in which a working path and a back-up path for realizing a redundant structure in a small-scale communication network are multiplexed onto the same path in a long-distance communication network, where small-scale communication networks, such as LANs, are connected with the long-distance communication network, such as a SONET, so as to obtain a system that can take advantage of the functions of the small-scale communication networks over a long distance.

Among the working paths and the back-up paths that constitute the redundant structure in the small-scale communication network, each of the back-up paths normally has a very small amount of data transmission corresponding to a control packet, and, therefore, one path can substantially accommodate the amount of data transmission corresponding to a pair of a working path and a back-up path. In view of this, each corresponding pair of the working paths and back-up paths are multiplexed onto the same path in the long-distance communication network. Thus, the communication resources can be efficiently utilized.

With this structure, the reliability of the system can be increased by virtue of the redundant structure of the small-scale communication networks, while the transmission bandwidth of the long-distance communication network can be efficiently utilized.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Referring to FIG. 3 through 6, a hardware structure in accordance with the present invention will first be described.

Figure 1:
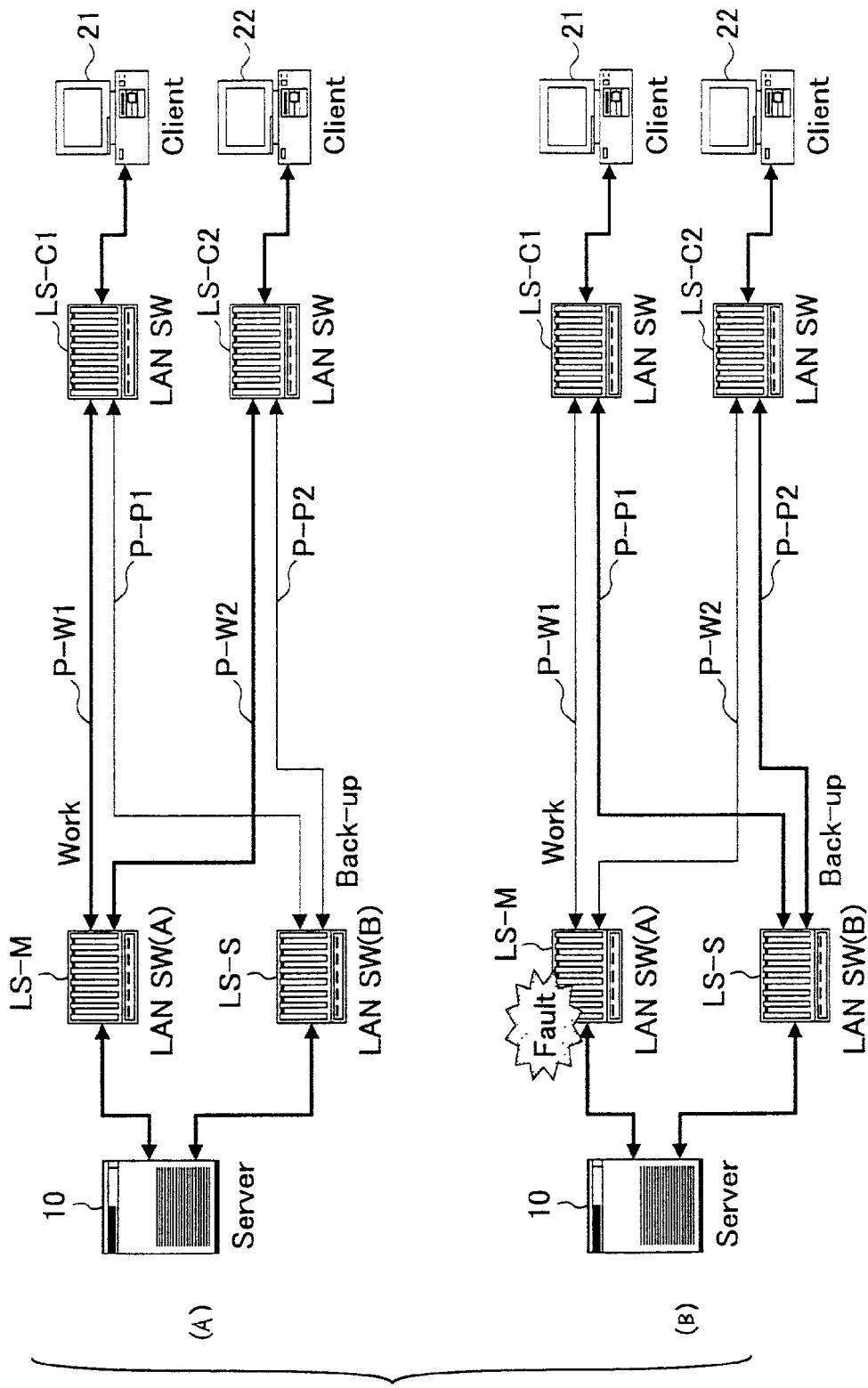
FIGS. 1A and 1B illustrate a structure in which a dial-homing method is applied to Ethernet LANs.
Figure 2:
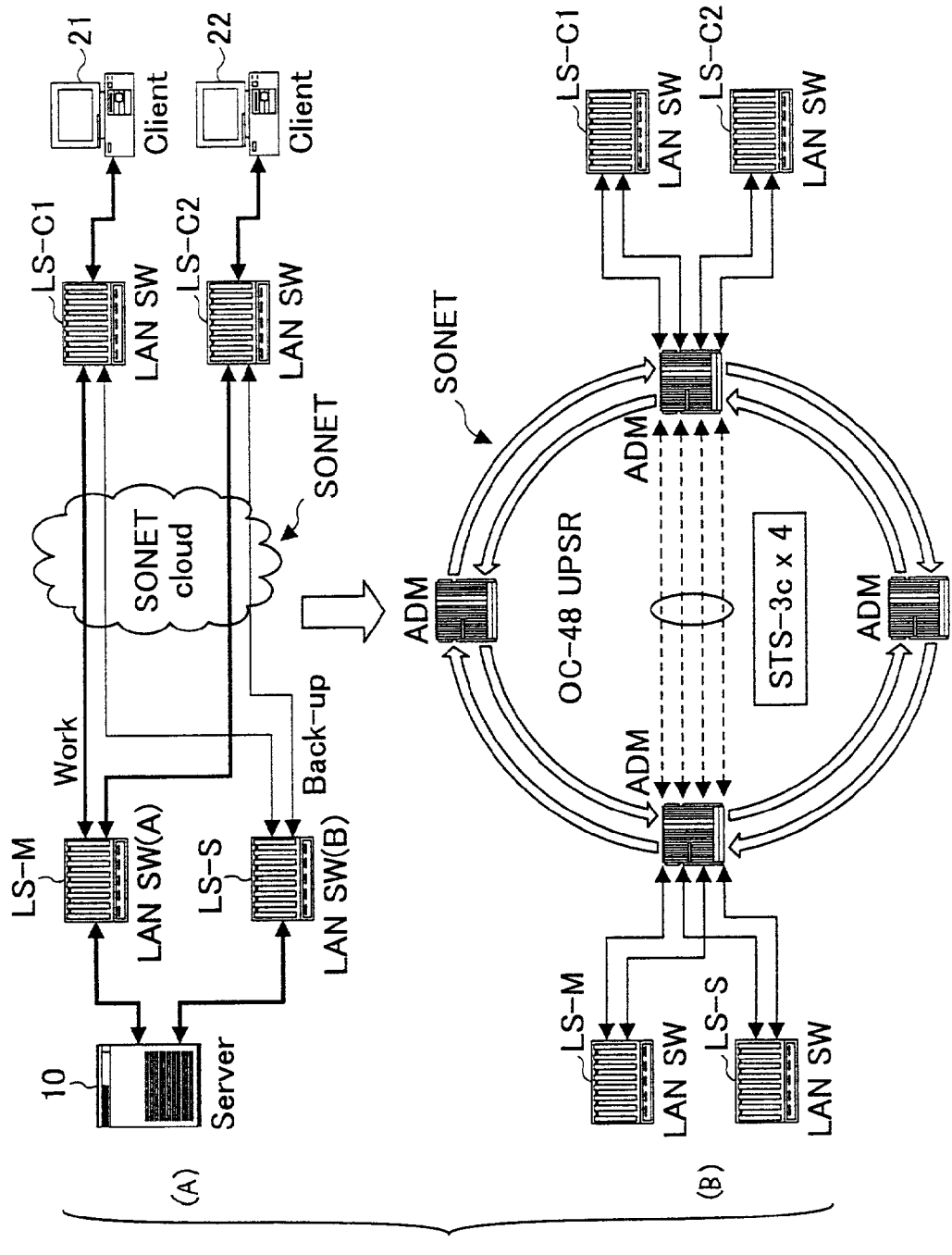
FIGS. 2A and 2B illustrate an example of a data transmission system for connecting the Ethernet LANS shown in FIGS. 1A and 1B to each other with a SONET.
Figure 3:
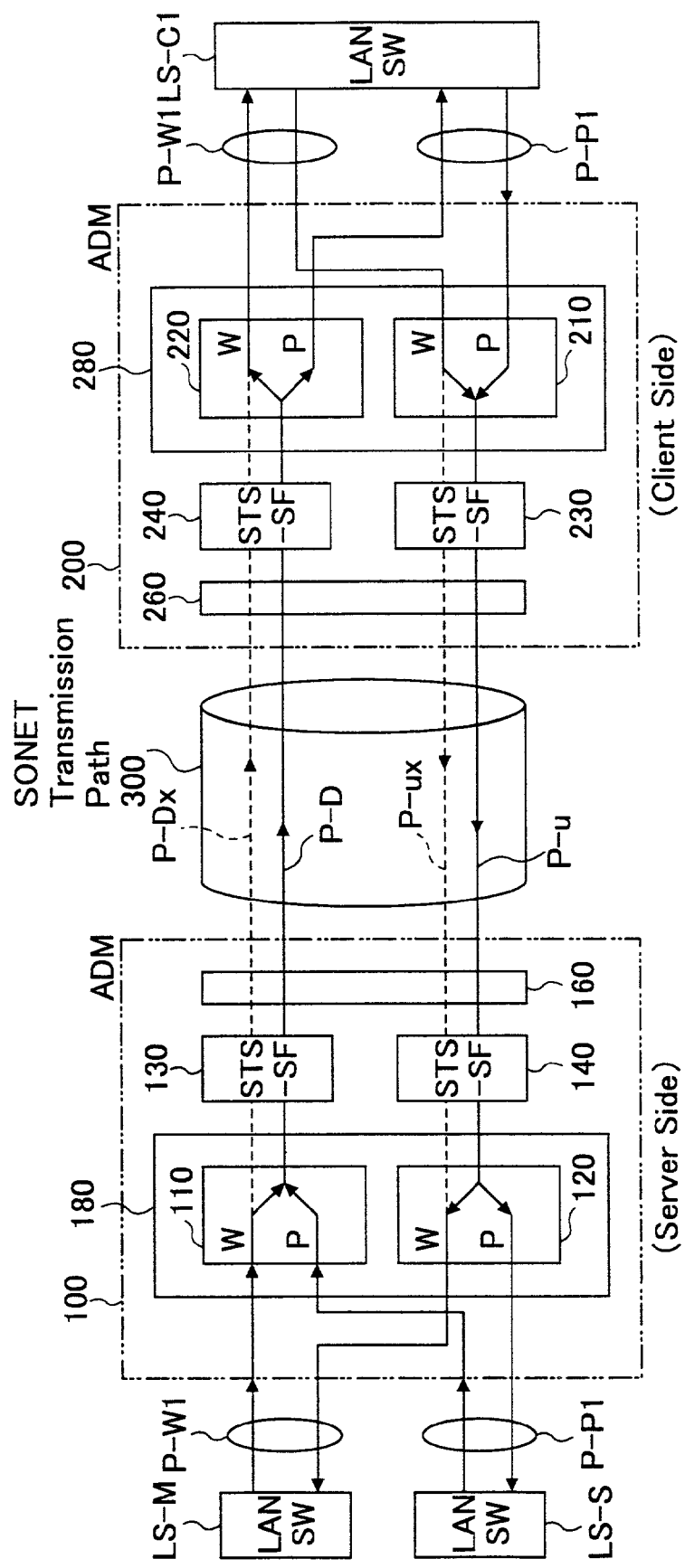
FIG. 3 is a schematic view of a principal structure in accordance with the present invention.
Figure 4:
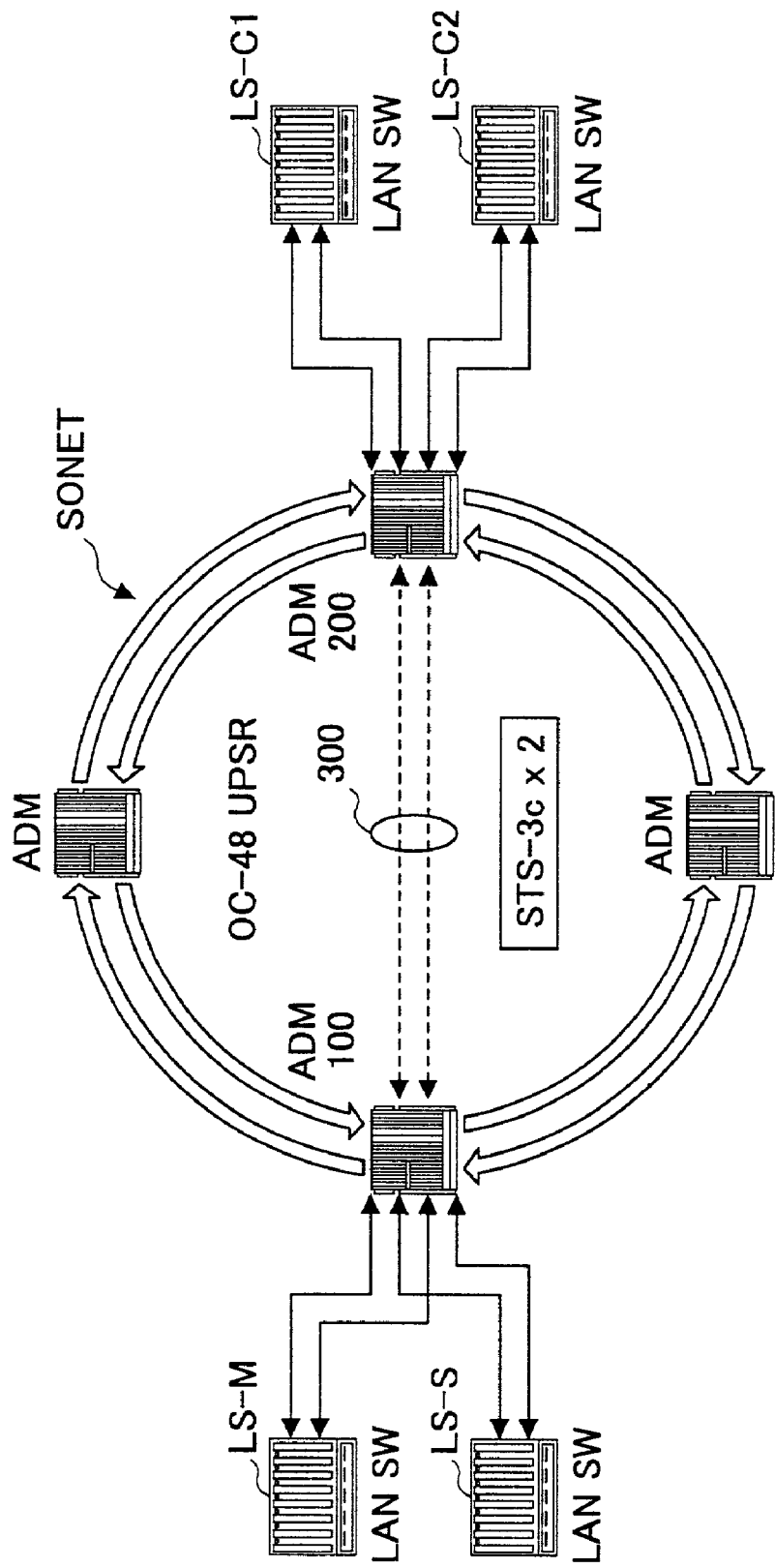
FIG. 4 is a schematic view of the SONET and the surroundings shown in FIG. 3.

FIG. 3 is a schematic view of the principal structure of this embodiment. In this structure, a SONET transmission system is employed so that dual-homing LANs can be used over a long distance, as in the Ethernet described with reference to FIGS. 1A and 1B. For ease of explanation, FIG. 3 shows the structure corresponding only to the client 21 shown in FIGS. 1A and 1B. However, it should be understood that the client 22 shown in FIGS. 1A and 1B can also be achieved by the same structure.

As shown in FIG. 3 through FIG. 6, this system includes a server SONET-ADM(Add/Drop Multiplexer) 100 (hereinafter referred to as the server ADM 100), and a client ADM 200, and optical cable transmission paths 300 that constitute a SONET.

Figure 7:
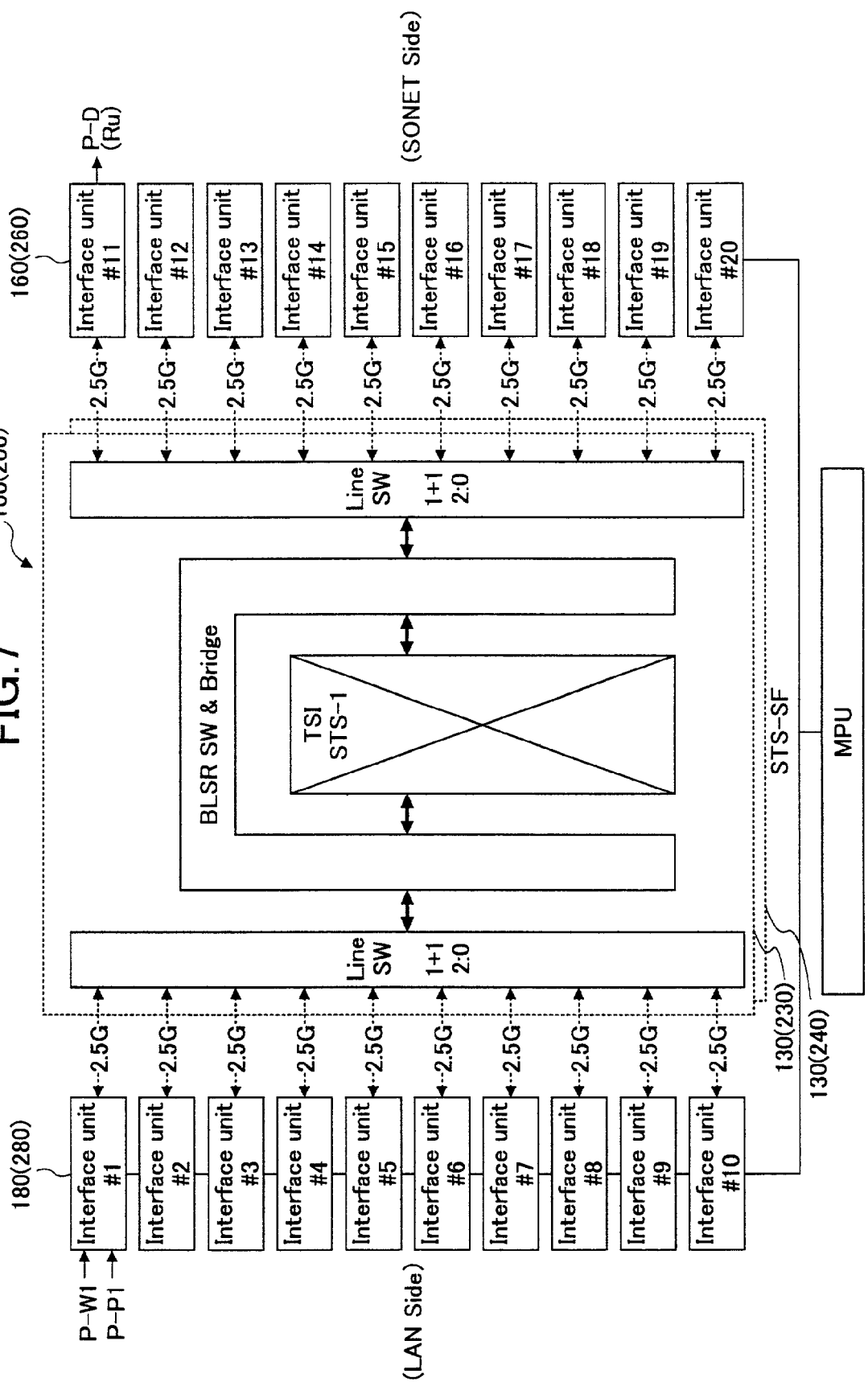
FIG. 7 is a block diagram showing the structure of the SONET-ADM device of FIG. 3.

Referring to FIG. 7, the server ADM 100 connects line interface cards 160 and tributary interface cards (or an Ethernet unit) 180 with a pair of switch fabrics 130 and 140 each having two STSs(Synchronous Transport Signals) as one unit (hereinafter referred to as STS-SFs 130 and 140). The interface cards 160 and 180 are connected to the switch fabrics 130 and 140 by transmitting STS-1 frame signals, the number of which depends on each corresponding bandwidth.

The client ADM 200 also has the same structure. As indicated by the brackets in FIG. 7, the client ADM 200 connects line interface cards 260 and tributary interface cards (or an Ethernet unit) 280 with switch fabrics 230 and 240. The structure of each switch fabric having a TSI (Time Slot Interchange) can be achieved by a known art relating to ADMs, and, therefore, explanation for the structure of each switch fabric is omitted from this description.

Referring back to FIG. 3, the server ADM 100 includes: the Ethernet unit 180 that has a multiplexing unit 110 for multiplexing a signal sent from a master LSN switch LS-M and a signal sent from a slave LSN switch LS-S, and a separating unit 120 for separating a signal sent from the SONET into two signals and supplying the separated signals to the master LAN switch LS-M and the slave LAN switch LS-S, respectively; the switch fabric 130 that maps the multiplexed signal in an Ethernet frame onto a SONET frame and then transmits the mapped signal to a SONET transmission path 300; the switch fabric 140 that extracts the Ethernet frame from the SONET frame and supplies the extracted frame to the separating unit 120; and the line interface 160 that acts as an interface between the SONET transmission path and the switch fabrics 130 and 140.

Likewise, the client ADM 200 includes: the Ethernet unit 280 that has a multiplexing unit 210 for multiplexing a working path signal P-W1 and a back-up path signal P-P1 supplied from a client LAN switch LS-C1, and a separating unit 220 for separating a signal sent from the SONET into two signals and supplying the separated signals to a working signal port and a back-up signal port of the client LAN switch LS-C1; the switch fabric 230 that maps the multiplexed in an Ethernet frame onto a SONET frame and then transmits the mapped signal to the SONET transmission path 300; the switch fabric 240 that extracts the Ethernet frame from the SONET frame and then supplies the extracted frame to the separating unit 220; and the line interface that serves as an interface between the SONET transmission path 300 and the switch fabrics 230 and 240.

Figure 5:
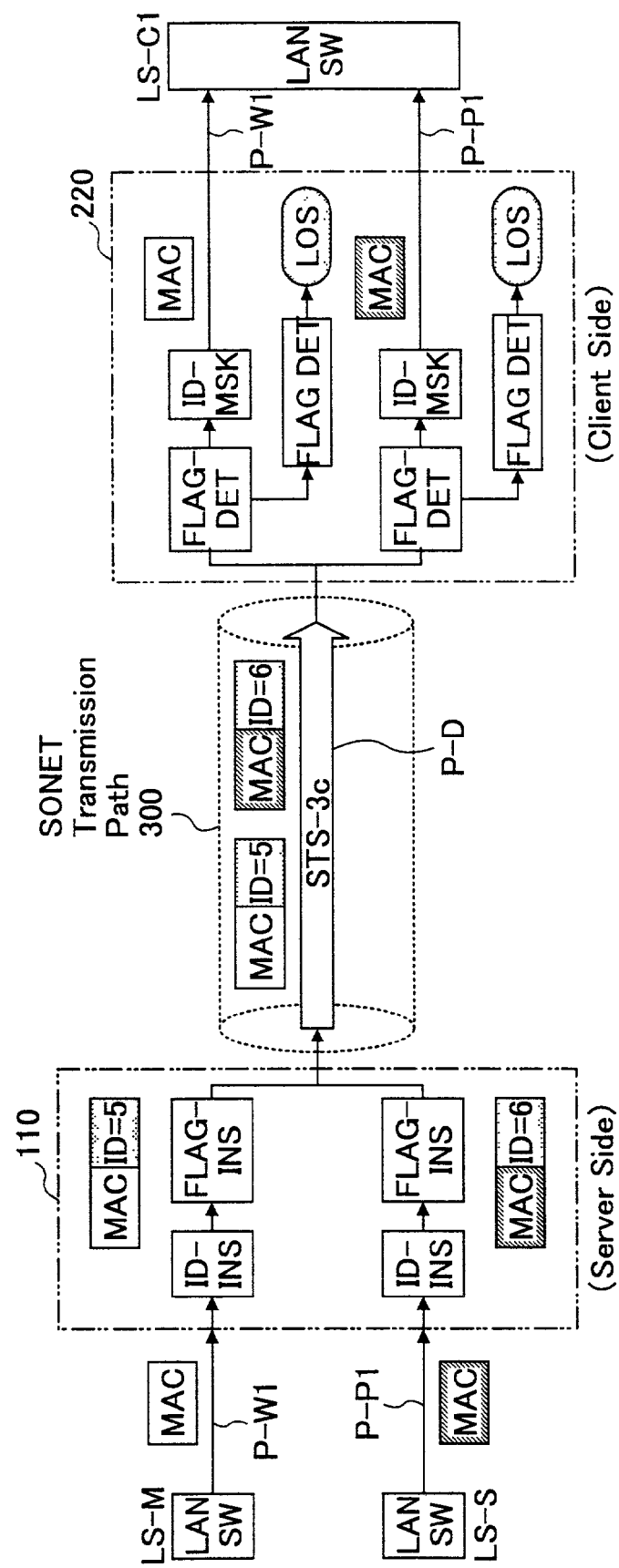
FIG. 5 is a schematic view of a structure in which the working paths and the back-up paths of FIG. 3 are multiplexed or separated.
Figure 6:
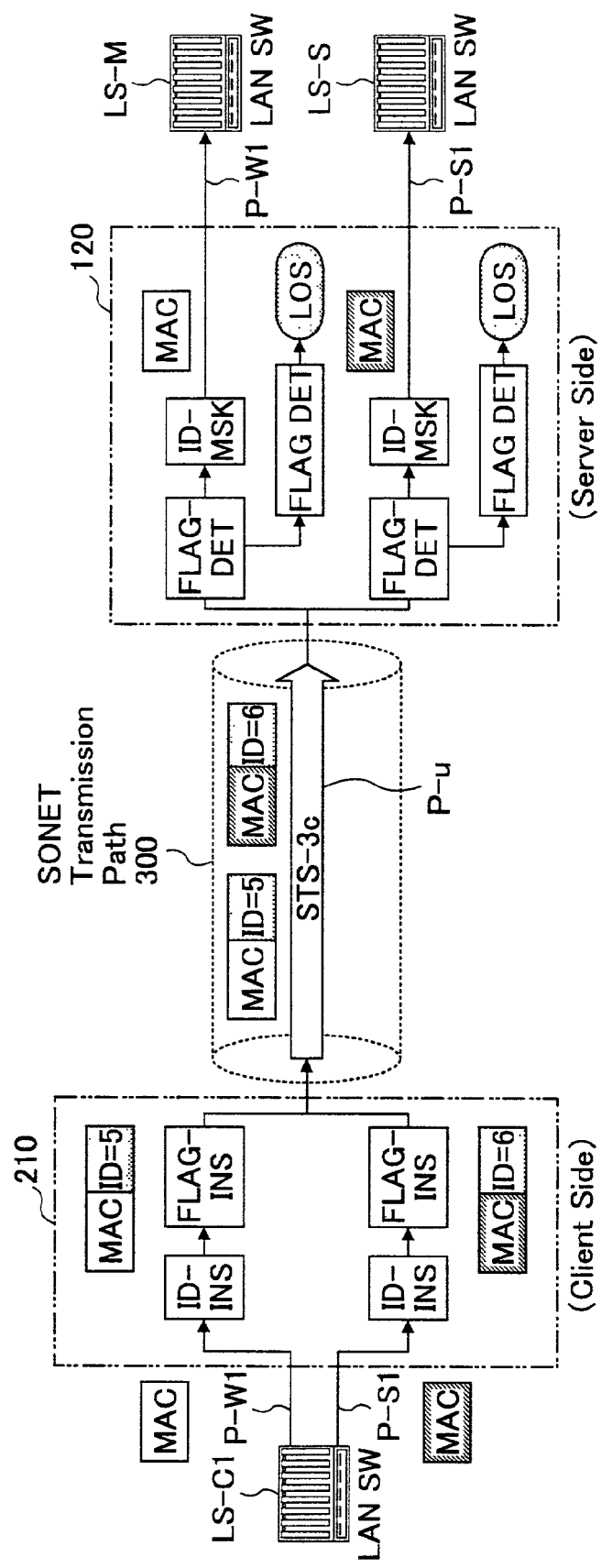
FIG. 6 is another schematic view of a structure in which the working paths and the back-up paths of FIG. 3 are multiplexed or separated.

Referring now to FIGS. 5 and 6, the multiplexing units 110 and 210, and the separating units 120 and 220 will be described. Where a signal is transmitted from the server side to the client side in FIG. 5, the multiplexing unit 110 maps each Ethernet frame on the master side and the slave side onto a SONET frame to be transmitted through the same STS path on the SONET. More specifically, each ID inserting unit ID-INS allocates a port ID to a MAC (Media Access Control) frame of the Ethernet. In the example shown in the figure, a port ID of 5 is allocated to the working packet, and a port ID of 6 is allocated to the back-up packet. Further, each flag inserting unit FLAG-INS allocates a predetermined flag that will be described later.

The separating unit 220 on the receiving side then separates the signal formed by multiplexing the working packet and the back-up packet onto the same STS path, so as to recover the original signals. There are two specific methods of doing this:

1) The port ID allocated on the transmitting side is detected so as to separate the packets.

2) The port ID allocated on the transmitting side is detected, and, if the detected port ID is identical to the receiving side port ID, the packet is passed on. On the other hand, if the detected port ID is not identical to the receiving side port ID, the packet is discarded.

Either of the above two methods is conducted at each ID processing unit ID-MSK. More specifically, if the working side port ID is 5, the packet is passed on, but, if the working side port ID is not 5, the packet is discarded. Likewise, the back-up side port ID is 6, the packet is passed on, but if the back-up side port ID is not 6, the packet is discarded. As a result of this control operation, packets can be correctly separated and supplied to the working port (W) and the back-up port (P) of the LAN switch LS-C1.

Meanwhile, each flag detecting unit FLAG-DET detects a flag. If a plurality of packets having a flag are detected in a row, it is determined that a fault has occurred in a corresponding signal transmission system, and the optical output toward the LAN side is shut down so as to automatically stop the packet transmission. As an example of the flag, a blank frame can be used. If a MAC frame is blank, the flag is considered to be set. For instance, if a fault such as a lost signal due to insufficient optical output from the LAN side is detected at each fault detecting unit LOS DET shown in FIG. 8, the corresponding flag inserting unit FLAG-INS inserts a blank in the MAC frame.

In a case where transmission is conducted from the client side to the server side, as shown in FIG. 6, basically the same processes as in the case of FIG. 5 are performed, and, therefore, explanation for those processes is omitted from this description.

Figure 8:
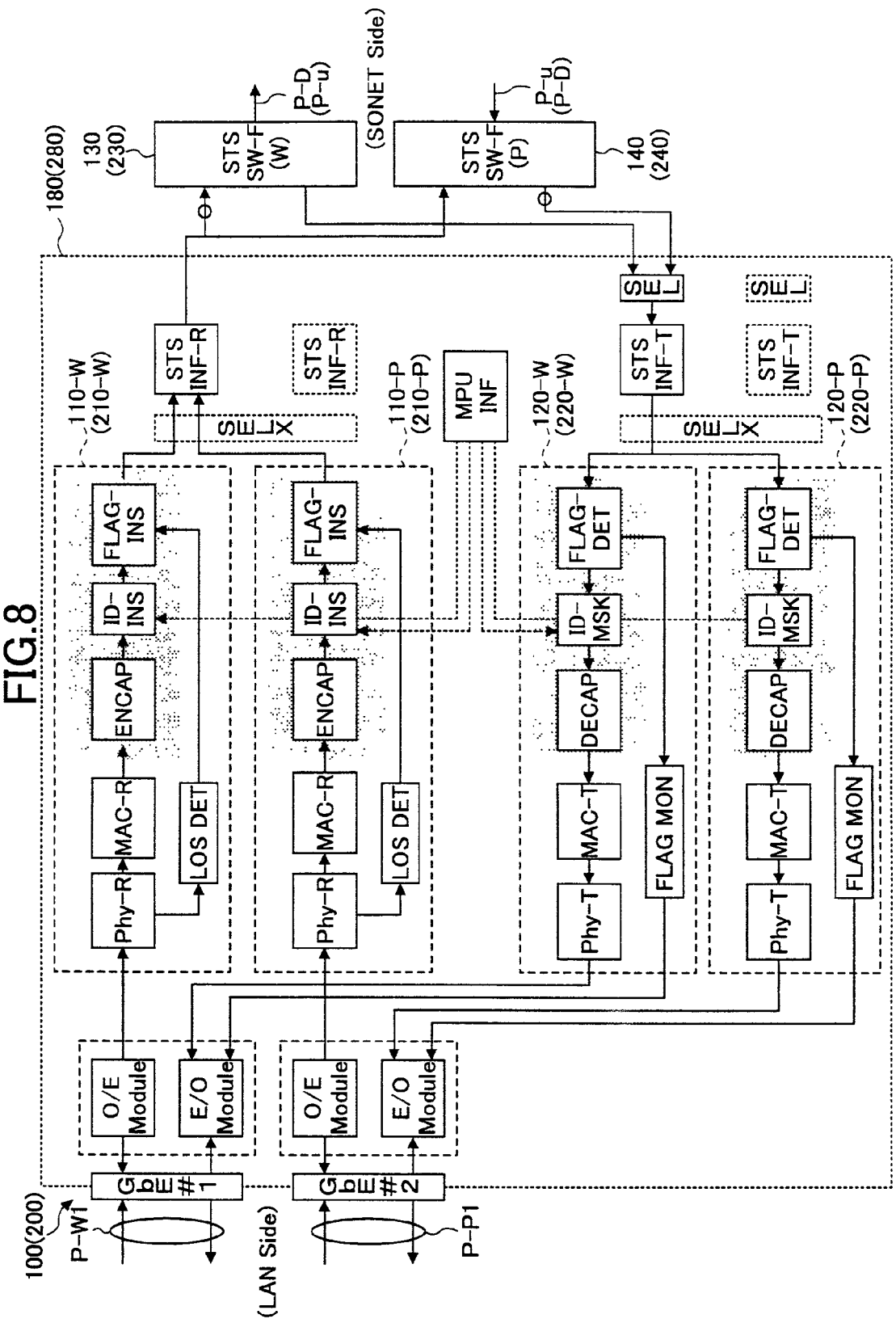
FIG. 8 is a block diagram showing the structure of the Ethernet unit of FIG. 3.

Referring now to FIG. 8, the Ethernet units 100 and 200 will be described in greater detail.

First, each of the multiplexing units 110W of the working side and 110-P of the back-up side includes a physical terminal unit Phy-R, a frame terminal unit MAC-R, an encapsulating unit ENCAP, one of the above described ID inserting units ID-INS, one of the above described flag inserting units FLAG-INS, and one of the above described fault detecting units LOS DET. Except for the ID inserting unit ID-INS, the flag inserting unit FLAG-INS, and the fault detecting unit LOS DET, the above components have the same structures as those in a conventional Ethernet unit, and, therefore, explanation for those components is omitted from this description.

Figure 10B:
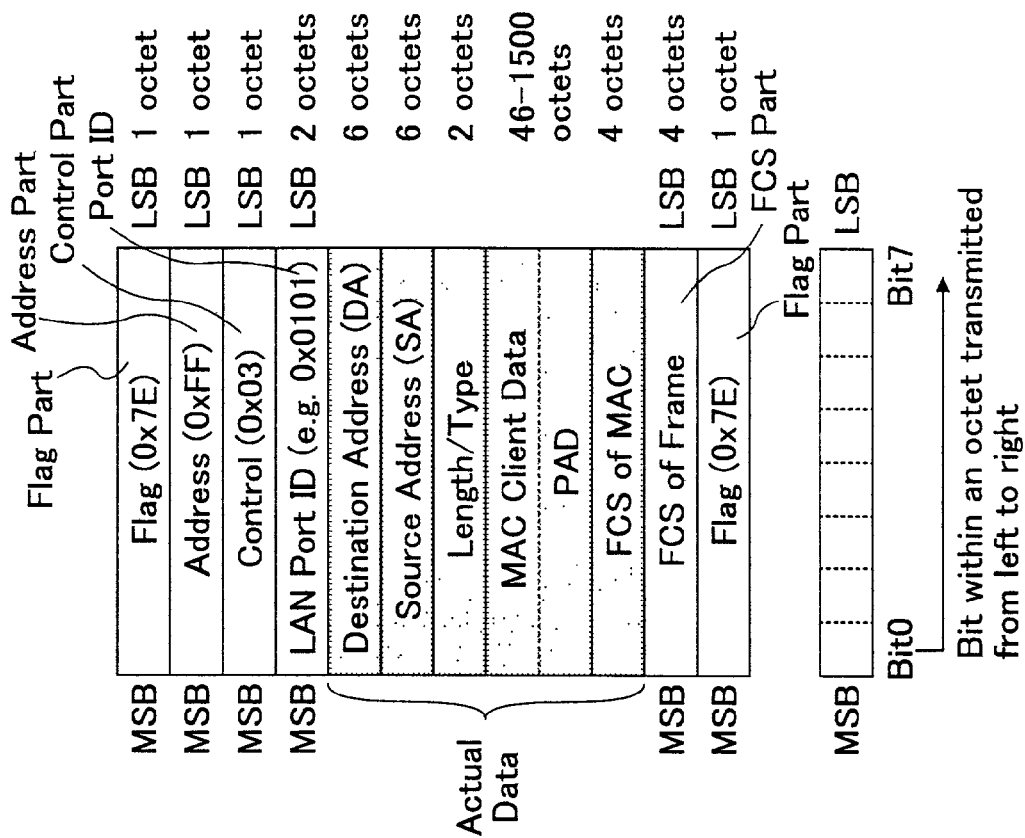
FIGS. 10A and 10B illustrate a process for mapping an Ethernet frame onto a SONET frame.
Figure 10A:
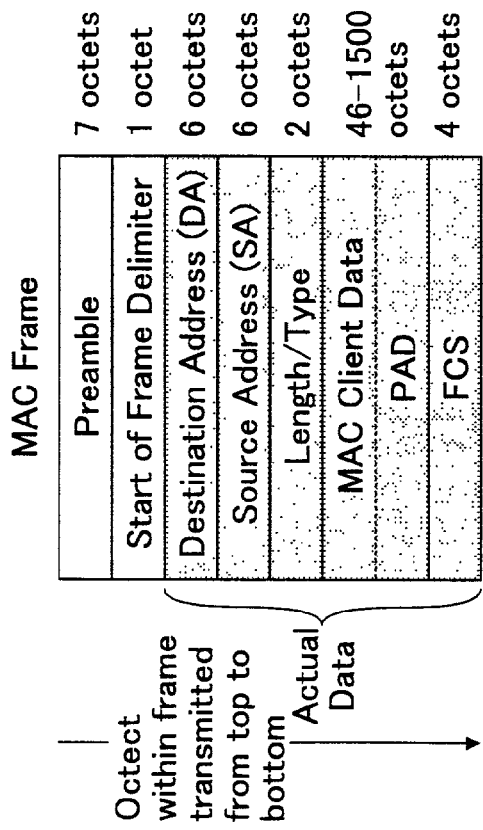
Figure 11:
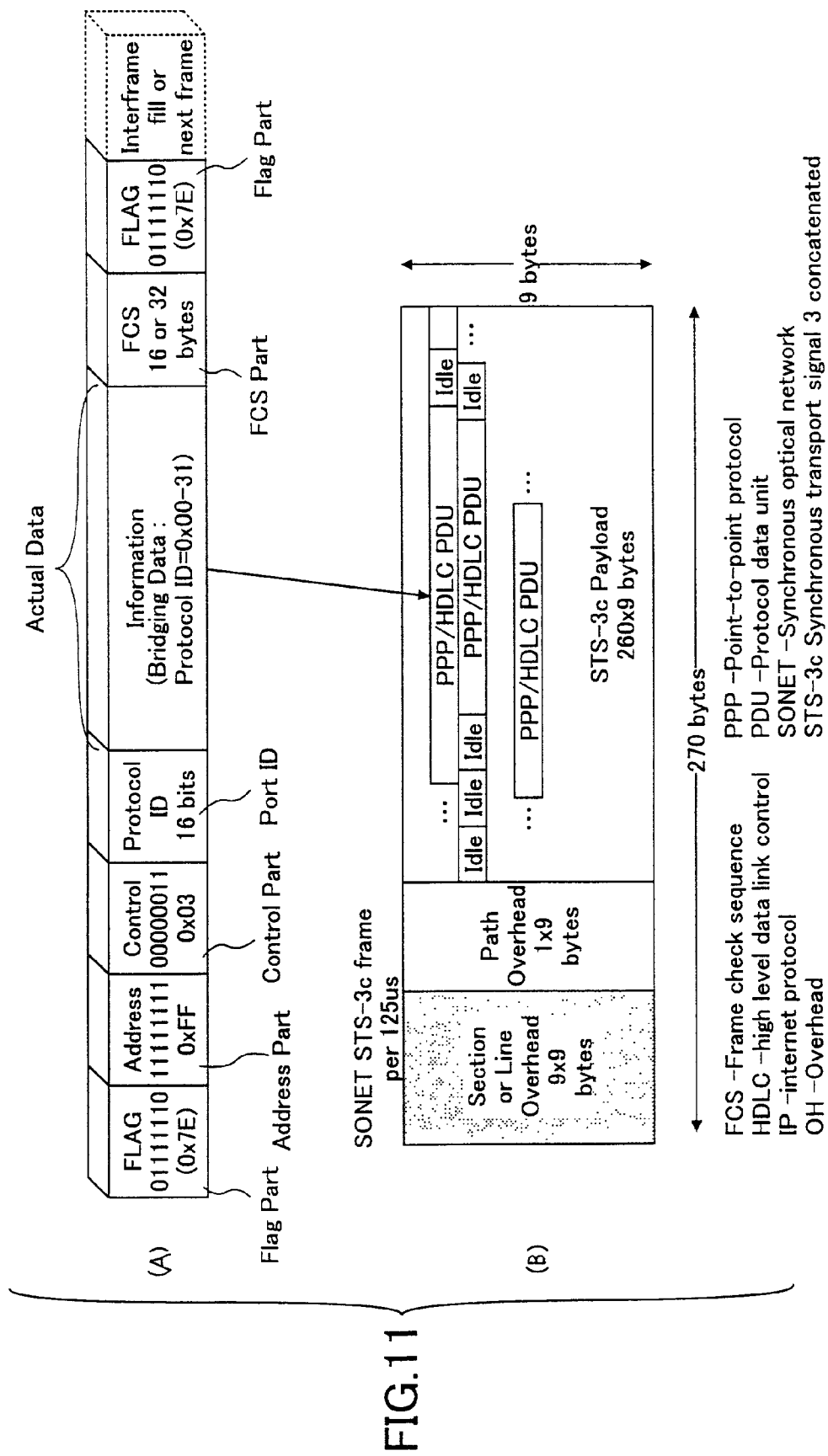
FIGS. 11A and 11B illustrate the process for mapping the Ethernet frame onto the SONET frame.

The encapsulating unit ENCAP extracts actual data from a standard Ethernet frame (or MAC frame) shown in FIG. 10A, and then allocates a flag part, an address part and a control part and a port ID, to the extracted actual data, as shown in FIGS. 10B and 11A. The extracted data is then mapped onto the payload of a standard SONET frame, as shown in FIG. 11B.

Each of the separating units 120-W of the working side and 120-P of the back-up side includes one of the above described flag detecting units FLAG-DET, one of the ID processing units ID-MSK, a decapsulating unit DECAP, a frame terminal unit MAC-T, a physical terminal unit Phy-T, and a flag monitoring unit FLAG MON. Except for the flag detecting unit FLAG-DET, the ID processing unit ID-MSK, and the flag monitoring unit FLAG MON, the above components have the same structures as those in a conventional Ethernet unit, and, therefore explanation for those components is omitted from this description.

When a flag is detected by the flag detecting unit FLAG-DET, the flag monitoring unit FLAG MON automatically stops the output of the packet at an electric/optical conversion module. The decapsulating unit performs an operation reverse to the operation performed by the encapsulating unit on the transmitting side, so that the Ethernet frame is extracted from the SONET frame.

In FIG. 8, the signals outputted from the multiplexing units 110-W and 110-P are inputted into both the switch fabric 130 and the switch fabric 140 via an interface unit STS INF-R, but the input is normally effective only for the switch fabric 130 (as indicated by a circle on the path in FIG. 8) by virtue of the switching function of the switch fabrics. Likewise, although the signals outputted from the switch fabrics 130 and 140 are inputted into the separating units 120-W and 120-P via an interface unit STS INF-T in FIG. 8, only the signal outputted from the switch fabric 140 is supplied to the separating units 120-W and 120-P (as indicated by a circle on the path in ,FIG. 8) by virtue of the selecting function of a selector SELX.

The client Ethernet unit 280 has the same structure as the above described server Ethernet unit 180, and, therefore, explanation for the structure of the client Ethernet unit 280 is omitted from this description.

Figure 9:
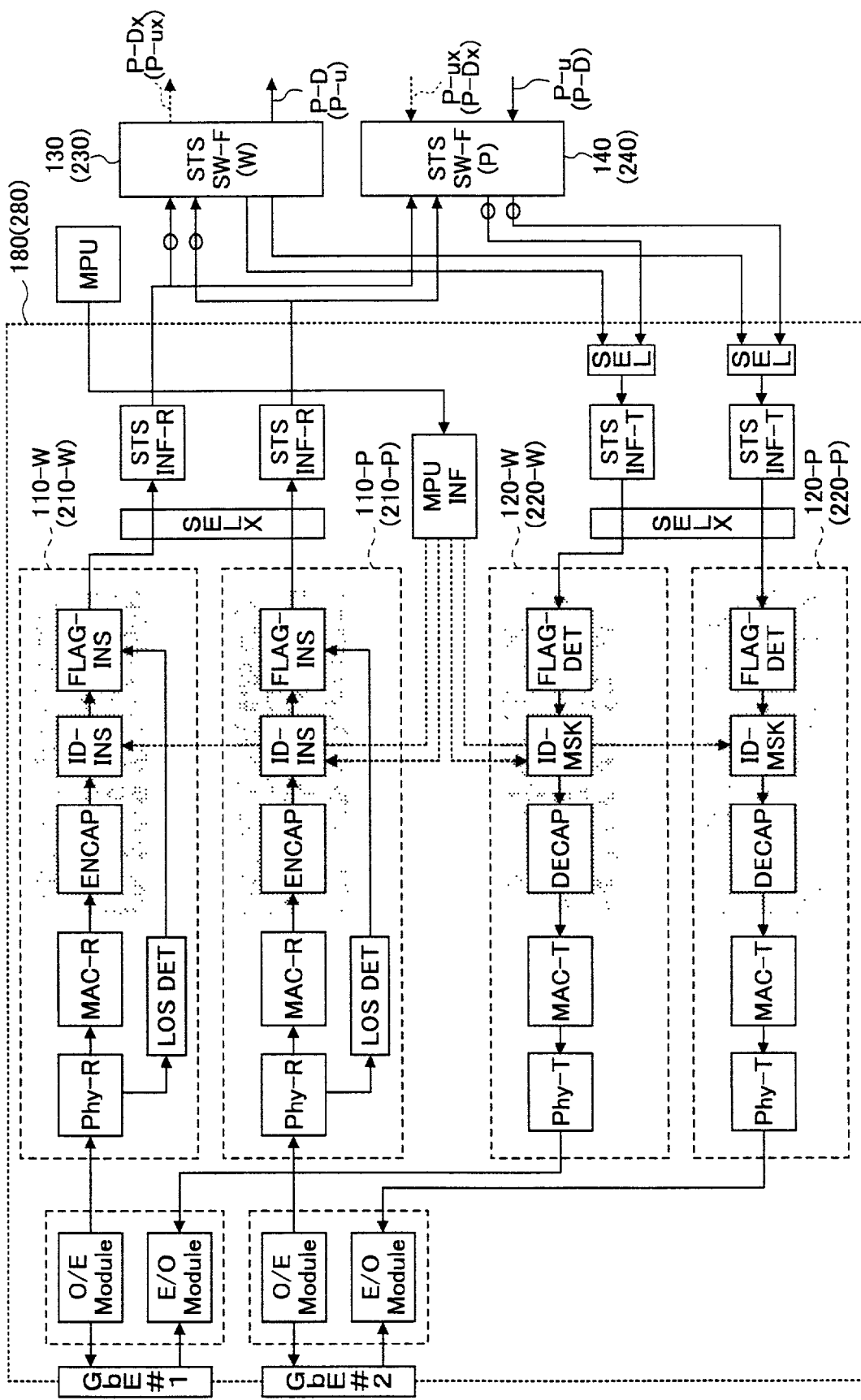
FIG. 9 is a block diagram illustrating a situation where the ports of the Ethernet are in one-to-one correspondence with the STS paths of the SONET, with the redundant structure not recognized in the structure of FIG. 8.

Referring now to FIG. 9, an operation mode in which the Ethernet units 180 and 280 are used but the above protection is not provided will be described.

In this non-protection mode, packets to be processed by the working multiplexing units 110-W and 220-W, the back-up multiplexing units 110-P and 220-P, the working separating units 120-W and 220-W, and the back-up separating units 120-P and 220-P, are not multiplexed or separated in the above described manner, but each of the packets is transmitted through an individual STS path of the SONET. Here, the paths of the Ethernets and the paths of the SONETS are in one-to-one correspondence. As shown in FIG. 9, the signals outputted from the multiplexing units 110-W and 110-P are separately supplied to the switch fabric 130 by virtue of the function of the selector SELX, and are then separately transmitted on individual paths P-D and P-Dx. Likewise, packets separately transmitted through individual paths are received by the switch fabric 140, and are then separately supplied to the separating units 120-W and 120-P.

With the selector SELX, it is possible to switch operation modes between a mode in which the protection is provided in a redundant structure, and a mode in which the protection is not provided where the ports of the Ethernets and the STS paths are in one-to-one correspondence. By such a switching function, it is possible to react flexibly to the external situation such as data traffic. As described above, only the paths provided circles in the drawings normally remain effective by virtue of the switch fabrics and the selector.

The same effects as the effects of the present invention can be obtained by applying a conventional VLAN (Virtual LAN) system. However, in a case where the above described functions are obtained by the VLAN system, there is a problem that users cannot use the VLAN function at will. In this embodiment, on the contrary, a working packet and a back-up packet can be multiplexed onto the same STS path, and the multiplexed packets can be separated to the original individual packets, so that users can use the VLAN functions at will.

As described so far, in accordance with the present invention, measures against faults (i.e. a redundant structure) on Ethernets are taken by providing dual-homing protection in a structure in which a SONET is applied to LANs of the Ethernet type. In this structure, a working (master) path and a back-up (slave) path are multiplexed onto the same STS path on the SONET. In this manner, the redundant structure inherent in the SONET can be utilized to the maximum, so that information packets can be certainly transmitted to the recipient. Also, since the transmission bandwidth of the SONET can be utilized, communication resources can be effectively used.

Furthermore, by adding a flag, the recipient can be notified of a fault in the Ethernets, and the optical output to the receiving Ethernet LAN can be automatically shut down. Accordingly, Ethernet users do not necessarily notice the longer transmission path via the SONET.

It should be noted that the present invention is not limited to the embodiments specifically disclosed above, but other variations and modifications may be made without departing from the scope of the present invention.

What is claimed is:

1. A method of transmitting data in a structure in which small-scale communication networks are combined with a long-distance communication network, said method comprising the step of multiplexing, on a packet basis, a working path signal and a back-up path signal of the small-scale communication networks onto the same path of the long-distance communication network, when a redundant structure in the small-scale communication networks are to be realized over the long-distance communication network, wherein each packet is of a variable-length type, and in the multiplexing, actual data is extracted from a frame of the small-scale communication network, information for distinguishing between the working path signal and the backup path signal is attached thereto, and then, it is mapped in a payload of a frame of the long-distance communication network.

2. The method as claimed in claim 1, further comprising the step of separating the multiplexed working path signal and back-up path signal by a filtering operation on a receiving side.

3. The method as claimed in claim 1, further comprising the step of automatically stopping data output to a receiving one of the small-scale communication networks, when a flag indicating a fault in a transmitting one of the small-scale communication networks is received.

4. The method as claimed in claim 1, wherein the small-scale communication networks are Ethernet LANs.

5. The method as claimed in claim 1, wherein the long-distance communication network is a SONET.

6. A method of transmitting data in a structure in which small-scale communication networks are combined with a long-distance communication network, said method comprising the steps of:

multiplexing a working path signal and a back-up path signal of the small-scale communication networks onto the same path of the long-distance communication network, when a redundant structure in the small-scale communication networks are to be realized over the long-distance communication network; and setting a flag for notifying a receiving one of the small-scale communication networks that a fault has occurred in a transmitting one of the small-scale communication networks, when the paths of the small-scale communication networks are to be mapped onto the path of the long-distance communication network.

7. A data transmission device for connecting small-scale communication networks to one another with a long-distance communication network, said device comprising a unit for multiplexing, on a packet basis, a working path signal and a back-up path signal of the small-scale communication networks onto the same path of the long-distance communication network, when a redundant structure in the small-scale communication networks is to be realized over the long-distance communication network, wherein each packet is of a variable-length type, and in the multiplexing, actual data is extracted from a frame of the small-scale communication network, information for distinguishing between the working path signal and the backup path signal is attached thereto, and then, it is mapped in a payload of a frame of the long-distance communication network.

8. The data transmission device as claimed in claim 7, wherein the multiplexed working path and back-up path are separated by a filtering operation.

9. The data transmission device as claimed in claim 7, wherein, when a flag indicating a fault in a transmitting one of the small-scale communication network, data output to a receiving one of the small-scale communication networks is automatically stopped.

10. The data transmission device as claimed in claim 7, wherein the small-scale communication networks are Ethernet LANs.

11. The data transmission device as claimed in claim 7, wherein the long-distance communication network is a SONET.

12. A data transmission device for connecting small-scale communication networks to one another with a long-distance communication network, said device comprising:

a unit for multiplexing a working path signal and a back-up path signal of the small-scale communication networks onto the same path of the long-distance communication network, when a redundant structure in the small-scale communication networks is to be realized over the long-distance communication network; and a unit for setting a flag to notify a receiving one of the small-scale communication networks that a fault has occurred in a transmitting one of the small-scale communication networks, when the paths of the small-scale communication networks are to be mapped onto the path of the long-distance communication network.

13. A data transmission device for connecting small-scale communication networks to one another with a long-distance communication network, said device comprising a unit for separating, on a packet basis, a working path signal from a back-up path signal of the small-scale communication networks in accordance with a signal transmitted through a path of the long-distance communication network onto which the working path and the back-up path are multiplexed, when a redundant structure in the small-scale communication networks is to be realized over the long-distance communication network, wherein each packet is of a variable-length type, and in the multiplexing, actual data is extracted from a frame of the small-scale communication network, information for distinguishing between the working path signal and the backup path signal is attached thereto, and then, it is mapped in a payload of a frame of the long-distance communication network.

14. A data transmission device for connecting small-scale communication networks to one another with a long-distance communication network, said device comprising:

a unit for multiplexing a working path signal and a back-up path signal of the small-scale communication networks onto the same path of the long-distance communication network, when a redundant structure in the small-scale communication networks is to be realized over the long-distance communication network; and a unit for switching modes between a first mode for applying the redundant structure of the small-scale communication networks to the long-distance communication network, and a second mode for transmitting data through the paths of the small-scale communication networks and paths of the long-distance communication network in one-to-one correspondence without the use of the redundant structure.

15. A data transmission device for connecting small-scale communication networks to one another with a long-distance communication network, said device comprising:

a unit for multiplexing a working path signal and a back-up path signal of the small-scale communication networks onto the same path of the long-distance communication network, when a redundant structure in the small-scale communication networks is to be realized over the long-distance communication network; and a unit for recognizing a fault in a transmitting one of the small-scale communication networks by detecting a flag set in a signal transmitted to notify a receiving one of the small-scale communication networks that the fault has occurred in the transmitting one of the small-scale communication networks, when the paths of the small-scale communication networks are to be mapped onto the path of the long-distance communication network.

\* \* \* \* \*